United States Patent
Sharper et al.

(10) Patent No.: US 6,546,024 B1
(45) Date of Patent: Apr. 8, 2003

(54) METHODS AND APPARATUS FOR TRANSMITTING DATA IN A PUBLIC NETWORK

(75) Inventors: Craig Sharper, Los Altos, CA (US); Sanjay K. Aiyagari, Santa Clara, CA (US); Mick Henniger, Sunnyvale, CA (US); Warren Meggitt, San Jose, CA (US); Gregory M. Coffeng, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/107,840

(22) Filed: Jun. 30, 1998

(51) Int. Cl.[7] ................................................. H04J 3/22
(52) U.S. Cl. ........................ 370/470; 370/545; 375/222
(58) Field of Search ................................ 370/465, 466, 370/470, 476, 545, 542, 543; 375/260, 222

(56) References Cited

U.S. PATENT DOCUMENTS

| | | | |
|---|---|---|---|
| 4,782,498 A | * 11/1988 | Copeland, III | 375/222 |
| 4,894,847 A | * 1/1990 | Tjahjadi et al. | 375/377 |
| 5,598,413 A | * 1/1997 | Sansom et al. | 370/468 |
| 5,809,033 A | * 9/1998 | Turner et al. | 370/522 |
| 5,930,312 A | * 7/1999 | Marum | 375/377 |
| 5,940,403 A | * 8/1999 | Williams | 370/465 |
| 6,118,766 A | * 9/2000 | Akers | 370/249 |

OTHER PUBLICATIONS

Advance Information of Bt8970, *Single–Chip HDSL Transceiver*; Brooktree Division of Rockwell Semiconductor Systems, Inc.; Dec. 1996.
Advance Information of Bt8953A, *HDSL Channel Unit*; Brroktree Corporation; Dec. 1996.
*Transmission and Multiplexing (TM); High Bit Rate Digital Subscriber Line (HDSL) Transmission System on Metallic Local Lines; HDSL Core Specification and Applications for 2 048 kbit/s Based Access Digital Sections*, European Telecommunications Standards Institute; ETR 152, Dec. 1996.

* cited by examiner

*Primary Examiner*—Chau Nguyen
*Assistant Examiner*—Soon-Dong Hyun
(74) *Attorney, Agent, or Firm*—Beyer Weaver & Thomas, LLP

(57) ABSTRACT

Methods and apparatus for transmitting and receiving data using framing circuitry designed to generate data frames of a first duration at a first data rate. According to the invention, data frames are generated and decomposed at lower data rates than the rate for which the framing circuitry was originally designed, i.e., the first data rate. The framing circuitry is programmed to organize a data stream into a sequence of data frames of the first duration or to decompose such data frames into a data stream. According to the invention, such a sequence of data frames corresponds to a selected one of a plurality of equivalent data rates. Each of the equivalent data rates are lower than the first data rate.

38 Claims, 5 Drawing Sheets

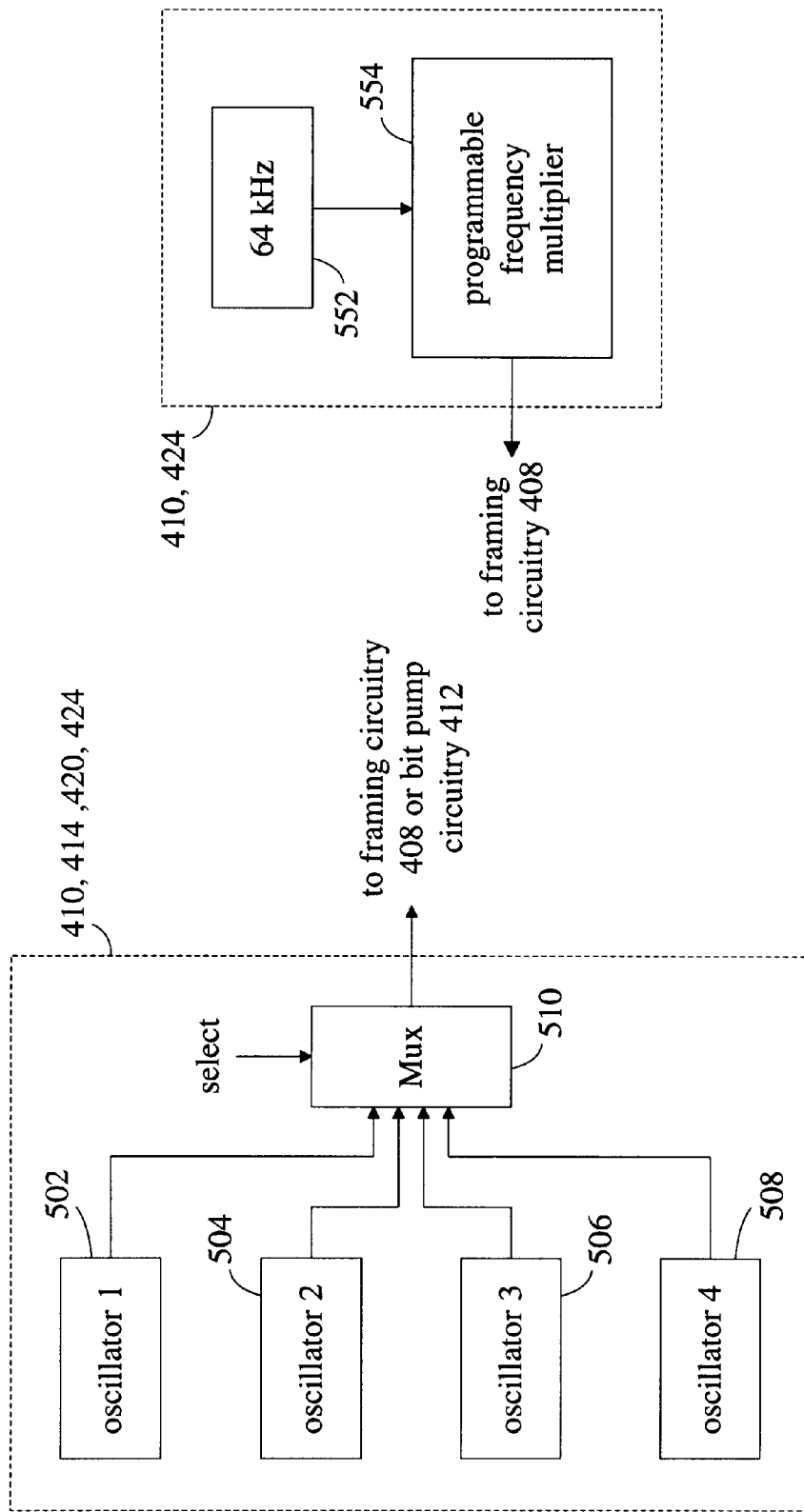

METHODS AND APPARATUS FOR TRANSMITTING DATA IN A PUBLIC NETWORK

BACKGROUND OF THE INVENTION

The present invention relates to transmission of data on a subscriber loop in a public network such as, for example, a telephone network. More specifically, the present invention provides an improvement of standard single line digital subscriber line (SDSL) technology.

A wide variety of technologies and transmission standards have been developed for transmission of data via currently existing public network resources. A substantial portion of these resources comprise copper twisted pair transmission lines. This is especially true for the final connections to individual subscribers, i.e., subscriber loops. Without other limitations such as core network filters, such copper lines can achieve practical data rates on the order of tens of megabits per second (Mbps). Of course, substantial attenuation occurs at the higher data rates thereby limiting the length of the subscriber loop which may be serviced at such rates. For example, 24 gauge copper supports reliable transmission of data at the DS1 standard, i.e., 1.544 kbps, also commonly referred to as T1, for up to 12,000 feet. By contrast, the same 24 gauge copper will only support the STS-1 standard, i.e., 51.840 Mbps, for lines of less than 1000 feet.

The term "digital subscriber line" refers to a modem or modem pair connected by one or more twisted pairs having a specific data frame format and associated transmission rate. The first digital subscriber line technology, referred to as IDSL, corresponds to what is also known as basic rate ISDN. IDSL technology transmits duplex data at 144 kbps over copper lines using a 2B1Q modulation scheme. The modems multiplex and demultiplex the data stream into two B channels (64 kbps each) and a D channel (16 kbps) as described in ANSI T1.601, the entirety of which is incorporated herein by reference for all purposes.

High data rate digital subscriber lines (HDSL) are related to the earlier IDSL using the same modulation scheme to transmit data at the T1 data rate over two twisted pairs as described in ANSI Committee T1 TR-28 and ETR 152, the entireties of which are incorporated herein by reference for all purposes. A single line digital subscriber line (SDSL) is a single pair version of HDSL, i.e., transmitting data at one-half the T1 data rate, i.e., 768 kbps, over a single twisted pair. For both HDSL and SDSL and as shown in FIG. 1, data are organized into 6 ms frames 102 comprising alternating overhead and payload sections 104 and 106. The four payload sections 106 each include twelve 97-bit payload blocks 108, 96 bits (110) of which are data and one bit (112) of which represents block overhead. This works out to the well known data rate of 768 kbps. Overhead sections 104 along with bits 112 represent an additional 16 kbps for an actual transmission rate of 784 kbps.

FIG. 2 is a simplified block diagram of a standard SDSL 202 connecting a central office or public branch exchange (represented by modem 204) and a subscriber premises (represented by modem 206). The data to be transmitted enters framing circuitry 208 of modem 204 at the raw data rate of 768 kbps. Framing circuitry 208 organizes the incoming data stream into the 6 ms frames described above with reference to FIG. 1 using a 768 kHz oscillator 210 and 16 kbps of frame overhead data generated by framing circuitry 208. The framed data are then sent to bit pump 212 where, using a 784 kHz oscillator 214, they are encoded according to the 2B1Q modulation scheme and transmitted via twisted pair line 216 to the subscriber premises as represented by modem 206.

At the subscriber premises, the modulated framed data are received at the rate of 784 kbps and demodulated by bit pump 218 which is clocked by a 784 kHz oscillator 220. The demodulated data are then received by framing circuitry 222 which strips off the 16 kbps frame overhead data and decomposes the 6 ms HDSL frames into a 768 kbps data stream. Framing circuitry 222 is clocked by a phase-locked loop (PLL) recovered clock (PLL circuitry 224) derived from the incoming data stream.

As mentioned above, standard HDSL transmission is only capable of servicing subscribers on loops of 12,000 feet or less at the T1 data rate. Unfortunately, a significant number of subscribers connected to the current network infrastructure are on loops greater than 12,000 feet. In fact, nearly one-fifth of all subscribers in the U.S. are on loops longer than 18,000 feet. Other subscriber loops have impedance mismatches caused by taps which dramatically reduce the high data rate utility of the loops. Thus, many subscribers are not able to take advantage of the increasing number of on-line services being offered with standard HDSL or SDSL data transmission. Obviously, neither will such subscribers be able to receive data transmitted according to higher rate standards such as DS2 or STS-1.

While plans to significantly decrease the average subscriber loop length in most telephone networks and replace copper with fiber optics are currently being implemented, it is likely that many subscribers will not benefit from such improvements for a number of years. Because it is desirable to provide high speed data transmission to most or all telephone network subscribers as soon as possible, efforts are currently under way to devise technologies which are capable of doing so over longer loop lengths than standard HDSL and SDSL. One technique for achieving this goal is illustrated with the block diagram of FIG. 3.

FIG. 3 is a simplified block diagram of a transmission loop 302 connecting a central office or public branch exchange (represented by modem 304) and a subscriber premises (represented by modem 306). In this example, the data to be transmitted enter bit pump 308 at a sub-standard SDSL data rate, i.e., 512 kbps. The bit pump modulates the data using a clock (oscillator 310) having an appropriately low frequency for the length of subscriber loop to be serviced. In this example, the frequency of oscillator 310 is 512 kHz. The modulated data are then transmitted via twisted pair 316 at an equivalent data rate of 512 kbps. At the subscriber end, the modulated data are received by bit pump 314 which is clocked by 512 kHz oscillator 316, i.e., the same frequency as oscillator 310. Bit pump 314 demodulates the data which results in the original 512 kbps data stream.

As is immediately obvious, this technique completely eliminates the framing circuitry to avoid being constrained by the frame format of HDSL technology. Unfortunately, this departure from the standard frame format presents its own difficulties. For example, there are a significant number of commercially available chip sets and other hardware which are designed to operate according to the HDSL standard using the HDSL frame format. However, for the lower speed technique described with reference to FIG. 3., this hardware may not be used. This forces manufacturers of such hardware and service providers to provide different technologies for different subscriber loop lengths.

Even more significantly, much of the phone network infrastructure is also designed to use the standard frame format. Thus, the solution of FIG. 3 requires modification or replacement of much of the existing system. Even if this were feasible, it would result in a system in which data are transmitted in a variety of different formats using a variety of different hardware depending upon the location of the subscriber. To the extent such a system goes against the development of transmission standards, it is clearly undesirable.

Moreover, departing from the standard frame format results in a loss of some of the advantages associated with having a standard frame. For example, 1) the ability to place all or a portion of the payload data into loopback mode to remotely test the link including bit error rate tests; 2) the ability to query the remote node customer premises device (s) or intermediate repeaters for configuration, status and the device type, version, or model number and name.

Even where the length of subscriber loops in a given service area is not an issue, there are other reasons why it is desirable for service providers to have the flexibility of offering a variety of data transmission rates without departing from a standard frame format. One reason is to more closely match the needs of individual subscribers. That is, not all subscribers require or can handle data at the maximum possible rate. It is therefore in the interest of the service provider to be more responsive to the individual requirements of specific subscribers by providing the appropriate rate for each subscriber. Such flexibility may, in turn, allow the service provider to more efficiently allocate its transmission bandwidth resources.

It is therefore desirable to provide data transmission techniques which take advantage of existing hardware and transmission standards and are capable of servicing any existing subscriber loop length. It is also desirable that such techniques give service providers the flexibility of offering subscribers a variety of data rate options without departing from those transmission standards.

SUMMARY OF THE INVENTION

According to specific embodiments of the present invention, methods and apparatus are provided which employ currently available hardware and a standard HDSL data frame format to transmit data at any of a variety of reduced data rates as may be appropriate with regard to the length and/or frequency response of a particular subscriber loop, or the specific needs of a particular subscriber. A specific embodiment of the invention employs framing circuitry at both ends of the subscriber loop based on currently available chip sets designed to operate with the standard 6 ms HDSL frame format. The chip sets are programmed to maintain all of the attributes of the standard frame except a selected attribute related to the payload blocks.

According to one embodiment, the payload block width is set lower than the standard 97 bits (768 kbps of data) to correspond to one of a plurality of data rates which are multiples of 64 kbps. The clock for the framing circuitry corresponds to the same multiple of 64 kHz and may be changed to correspond to any of the plurality of data rates. Similarly, the clock for the bit pump corresponds to the appropriate multiple of 64 kHz plus 16 kHz. In this way, the 6 ms frame length along with most other frame attributes are maintained, thereby making the transmitted data compatible with current network infrastructure hardware as well as retaining the benefits associated with having a standard frame.

According to a second embodiment, a specific number of the bits in each payload block are programmed to remain unused therefore reducing data throughput and thereby the effective data rate. Like the previously described embodiment, this embodiment has the significant advantage of retaining the standard 6 ms frame. Unlike the previously described embodiment, this embodiment only requires one set of clocks for all of the possible data rates. Given that no additional clock circuitry is required, and that each data bit in the standard HDSL frame represents 8 kbps of data, this means that transmission rates may be offered in increments of 8 kbps.

Thus, the present invention provides methods and apparatus for transmitting a data stream using framing circuitry designed to generate data frames of a first duration at a first data rate. According to the invention, data frames are generated at lower data rates than the rate for which the framing circuitry was designed, i.e., the first data rate. The framing circuitry is programmed to receive and organize the data stream into a sequence of data frames each of the first duration. The sequence of data frames corresponds to a selected one of a plurality of equivalent data rates. Each of the equivalent data rates are lower than the first data rate. According to a more specific embodiment, modulation circuitry modulates the sequence of data frames and transmits the modulated data frames at a selected one of a plurality of framed data rates. First clock circuitry provides any of a first plurality of clock signals to the framing circuitry. Each of the first plurality of clock signals corresponds to one of the plurality of equivalent data rates. Second clock circuitry provides any of a second plurality of clock signals to the modulation circuitry. Each of the second plurality of clock signals corresponds to one of the plurality of framed data rates.

According to other embodiments of the invention, methods and apparatus are provided for receiving a modulated sequence of data frames. According to a specific embodiment, the modulated sequence of data frames are transmitted at a selected one of a plurality of framed data rates. Demodulation circuitry receives and demodulates the modulated sequence of data frames thereby generating a demodulated sequence of data frames each having a first duration. Framing circuitry is employed which is designed to decompose data frames of the first duration into a data stream at a first data rate. According to the invention, the framing circuitry is programmed to receive and decompose the demodulated sequence of data frames into a data stream corresponding to a selected one of a plurality of equivalent data rates. Each of the equivalent data rates is lower than the first data rate. As described above with reference to specific embodiments for transmitting data, specific embodiments may include first clock circuitry which provides any of a first plurality of clock signals to the framing circuitry. Each of the first plurality of clock signals corresponds to one of the plurality of equivalent data rates. According to still more specific embodiments, second clock circuitry provides any of a second plurality of clock signals to the demodulation circuitry. Each of the second plurality of clock signals corresponds to one of the plurality of framed data rates.

A further understanding of the nature and advantages of the present invention may be realized by reference to the remaining portions of the specification and the drawings.

BRIEF DESCRIPTION OF THE DRAWINGS

FIGS. 5a and 5b are simplified block diagrams of two different clock circuitry implementations for use with various embodiments of the invention.

DESCRIPTION OF SPECIFIC EMBODIMENTS

Figure 1:
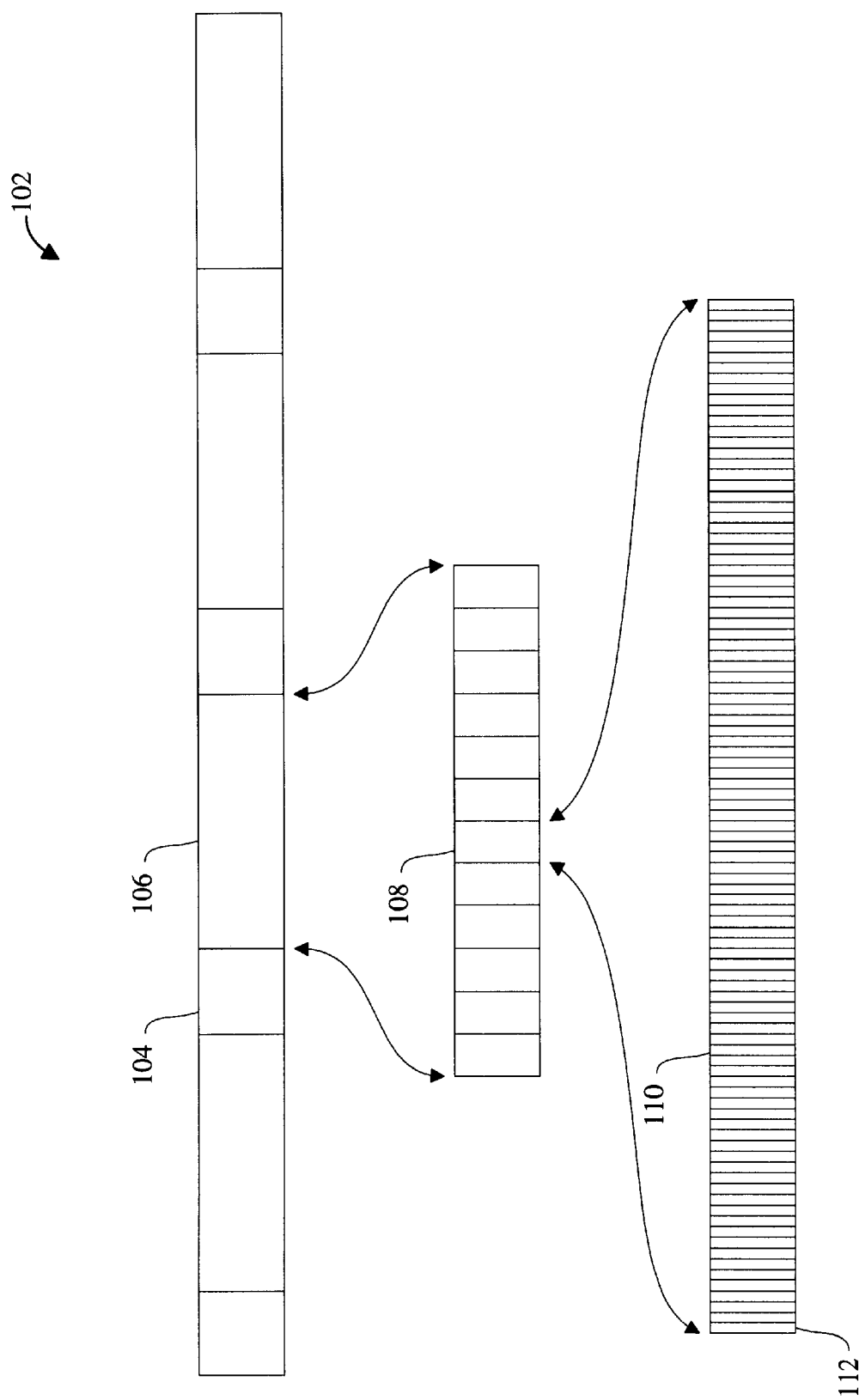
FIG. 1 is a simplified block diagram of a standard HDSL frame format.
Figure 2:
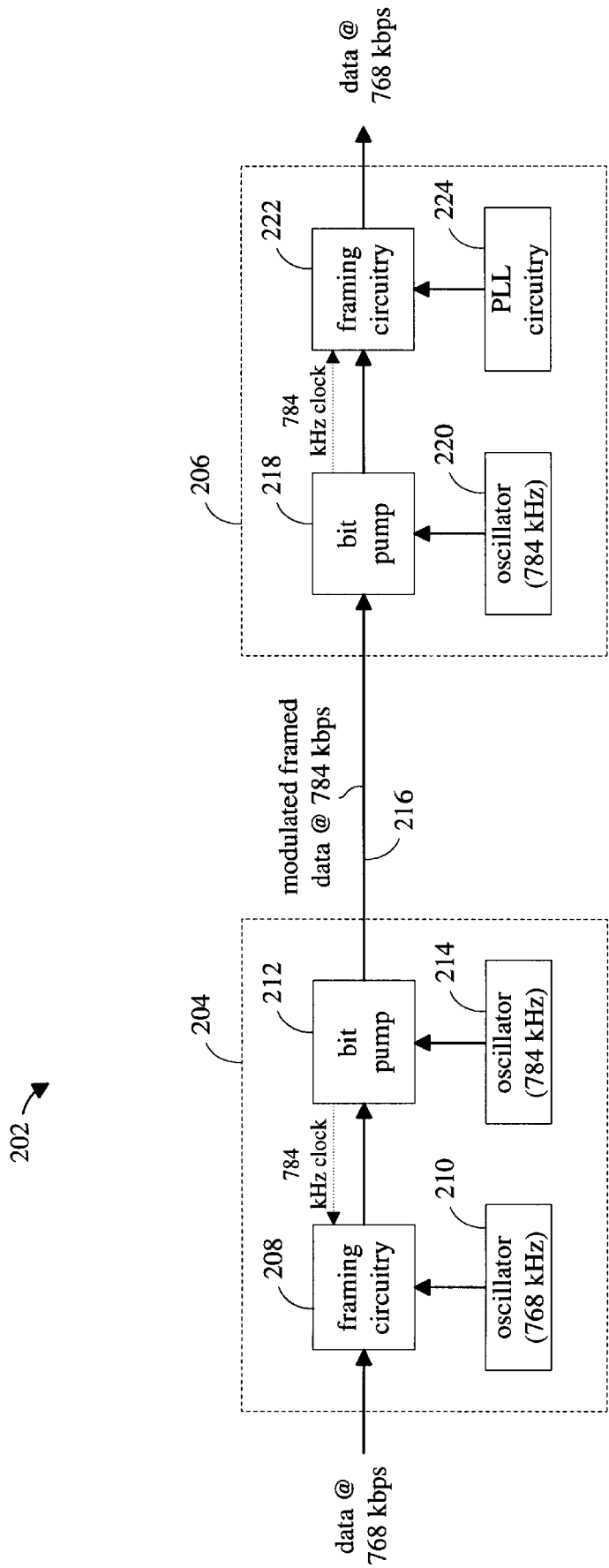
FIG. 2 is a simplified block diagram of a standard SDSL connecting a central office or public branch exchange and a subscriber premises.
Figure 3:
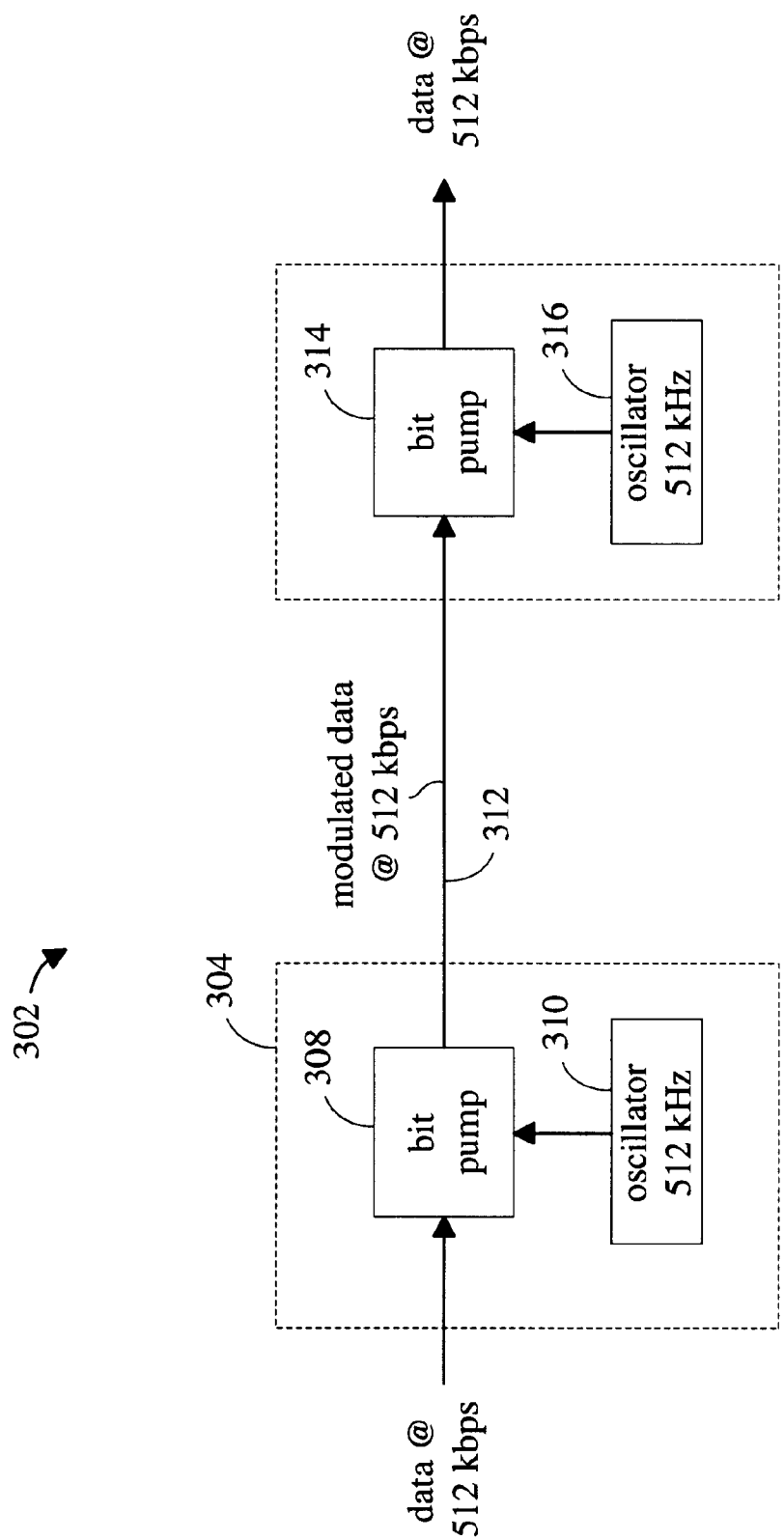
FIG. 3 is a simplified block diagram of a transmission loop connecting a central office or public branch exchange and a subscriber premises.
Figure 4:
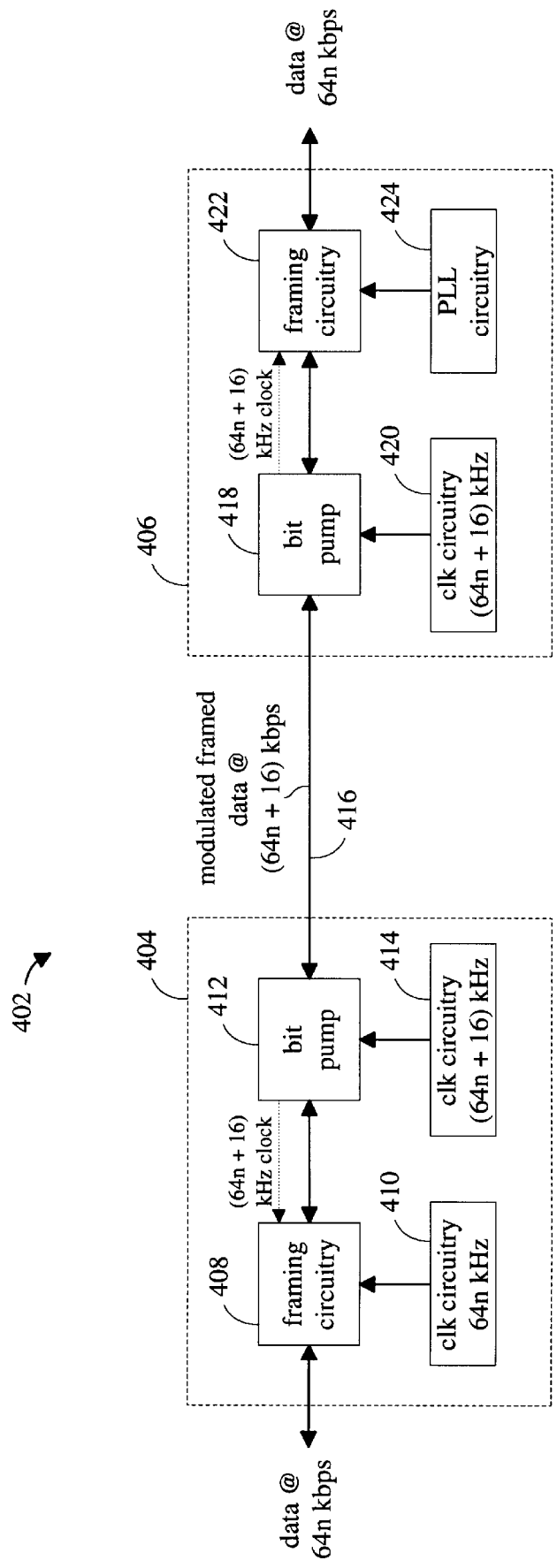
FIG. 4 is a simplified block diagram of an SDSL connecting a central office or public branch exchange and a subscriber premises according to a specific embodiment of the invention.

FIG. 4 is a simplified block diagram of an SDSL 402 connecting a central office or public branch exchange (represented by modem 404) and a subscriber premises (represented by modem 406) according to a specific embodiment of the invention. In this example, the data to be transmitted enters framing circuitry 408 at the raw data rate of 768 kbps. It will be understood that data may enter the subscriber loop at a variety of rates without departing from the invention. Framing circuitry 408 may be based on chip sets from, for example, the Brooktree Bt8953A Channel Unit or the Level One SK70720 MDSL Framer chip. Using 16 kbps of frame overhead data, framing circuitry 408 organizes the incoming data stream into frames similar to those described above with reference to FIG. 1 with an important exception. Instead of the payload blocks having 97 bits, the chip set is programmed to generate frames with payload blocks having less than 97 bits. For example, according to a specific embodiment, each payload block has 49 bits. According to another embodiment, each payload block has 57 bits. The programming typically involves writing a value into a chip set register which governs the number of bits in a payload block. The currently available chip sets use this programmability to be able to support both U.S. and European HDSL and SDSL data rates, e.g., 784, 1168, and 2320 kbps.

In these embodiments, all other frame parameters, e.g., number of payload blocks, are kept the same as for standard HDSL/SDSL transmission, including the frame duration of 6 ms. As discussed above, this helps to ensure that the transmitted frames are compatible with any hardware they are likely to encounter. Maintenance of the 6 ms frame duration is accomplished using clock circuitry 410 to provide the clock rate necessary to achieve the desired frame length given the narrower width of the payload blocks. That is, for each data rate a clock rate must be provided which results in a 6 ms frame.

According to a specific embodiment, and as shown in FIG. 5a, clock circuitry 410 and/or clock circuitry 414 comprise a plurality of oscillators 502–508 each of which corresponds to a particular data rate below 768 kbps or line rate below 784. According to various embodiments, oscillators 1–4 may generate signals at, for example, 128 kHz, 320 kHz, 448 kHz, and 640 kHz for data rates. In specific embodiments, each of the oscillators corresponds to a data rate which is some multiple of 64 kbps. This is denoted in FIG. 4 with the term 64n kHz. According to other embodiments, oscillators 1–4 may generate signals at, for example, 144 kHz, 336 kHz, 464 kHz, and 656 kHz for line rates. A multiplexer 510 is used to gate the appropriate clock rate to framing circuitry 408 or bit pump 412. According to another embodiment shown in FIG. 5b, clock circuitry 410 comprises a single 64 kHz oscillator 552 and programmable multiplier circuitry 554 which together generate a clock signal at a multiples of 64 kHz below 768 kHz.

Regardless of the manner in which the clock signal is generated, for the embodiment in which each payload block is 49 bits wide, the data rate for a 6 ms frame needs to be 384 kbps, and therefore the clock rate supplied by clock circuitry 410 is 384 kHz. Similarly, the clock rate supplied for a 57-bit payload block is 448 kHz.

The framed data are then sent to bit pump 412 where, using clock circuitry 414, they are encoded according to the 2B1Q modulation scheme and transmitted via twisted pair line 416 to the subscriber premises as represented by modem 406. Clock circuitry 414 generates a clock signal which is 16 kHz greater than the frequency generated by clock circuitry 410 to account for the 16 kbps of frame overhead. This is denoted with the term (64n+16) kHz. As discussed above, clock circuitry 414 may be implemented using the multiple oscillator design shown in FIG. 5a.

At the subscriber premises, the modulated framed data are received and demodulated by bit pump 418 which is clocked by clock circuitry 420 at the same rate as clock circuitry 414. As with clock circuitry 414, clock circuitry 420 may be implemented using the multiple oscillator design shown in FIG. 5a. The demodulated data are then received by framing circuitry 422 which strips off the 16 kbps frame overhead data and decomposes the 6 ms HDSL frames into the original n*64 kbps data stream. Framing circuitry 422 is clocked by a PLL clock derived from the incoming data stream.

Framing circuitry 422 may also be based on the HDSL chips sets described above with reference to framing circuitry 408. As with framing circuitry 408, the chip set upon which framing circuitry 422 is based is programmed operate with frames having fewer than the standard 97 bits in each payload block. The payload block length for which the chip set is programmed is the same as that for which the chip set upon which framing circuitry 408 is based is programmed. In addition, as discussed above with reference to clock circuitry 410, PLL circuitry 424 supplies the appropriate clock signal to reconstruct the original data stream depending upon the number of bits per payload block for which framing circuitry 422 is programmed.

According to another embodiment of the invention, variable data rates are achieved without the necessity for multiple oscillators to support each of the different rates. Instead of changing the number of bits in a payload block as described above, this embodiment of the invention discards a programmable number of bits in the payload blocks of each received frame. For transmitted frames the payload blocks are padded with a corresponding number of "dummy bits". This is achieved by programming a register associated with the framing circuitry chip set which defines how many of the bits in each payload block contain data and thus how many are unused.

Thus, the rate at which information is actually transmitted and received is always some maximum rate defined by the framing circuitry clock. However, because some programmable portion of each frame's payload blocks are unused, the effective data rate may be less than the maximum rate. In fact, the effective HDSL data rate may be adjusted in increments of 8 kbps (i.e., each payload bit represent 8 kbps).

While, this embodiment of the invention achieves the goal of maintaining the standard HDSL frame duration of 6 ms, it does not have the desirable advantage of the previously described embodiment whereby longer loop lengths may be supported. This is because the actual data rate is always the same (i.e., the maximum rate) for this embodiment. However, by the same token, and as mentioned above, this embodiment does not require an additional set of clocks for each supported data rate. Thus, the service provider has the flexibility of providing a wide variety of data rates to match the specific needs of each of its customers without the need for any additional hardware.

Moreover, an additional benefit may be realized according to this embodiment which would enable the service provider to more efficiently allocate its available data transmission bandwidth. Instead of leaving data bits in a payload block unused, the bits could be used for data intended for another user. That is, data intended for more than one destination may be interleaved within each frame at least until the paths to the different destinations diverge.

The present invention uses the programmability of HDSL chip sets to achieve lower transmission speeds without sacrificing the benefits of having a standard data frame. With lower transmission speeds, longer subscriber loop lengths may be serviced than with current techniques and/or service providers may cater to the specific needs of individual subscribers. All of this may be done without the development of new modem chip sets or the introduction of new hardware in the current telephone network infrastructure. Thus, the present invention represents an efficient, low cost solution to the problem of delivering multimedia and other data intensive content to virtually all subscribers on current telephone networks in a manner appropriate to the specific needs of each.

While the invention has been particularly shown and described with reference to specific embodiments thereof, it will be understood by those skilled in the art that changes in the form and details of the disclosed embodiments may be made without departing from the spirit or scope of the invention. For example, other clock circuitry implementations than those shown in FIGS. 5a and 5b may be employed to provide multiple clock signals to the framing and modulation circuitry of the invention. One such clocking technique is described in commonly assigned, copending U.S. patent application Ser. No. 09/109,991, now issued as U.S. Pat. No. 6,195,385 for HTU-C CLOCKING FROM A SINGLE SOURCE filed simultaneously herewith, the entire specification of which is incorporated herein by reference for all purposes. Moreover, the principles described herein may be applied to more than HDSL and SDSL transmission and data frame standards. That is, manipulation of one or more data frame parameters may be used with hardware designed for other transmission standards to allow for the provision of multiple data rates and/or the servicing of longer subscriber loops.

Finally, the inventions described herein may be employed in combination with other techniques to provide even greater flexibility with regard to the support of multiple data rates. One such technique is described in commonly assigned, copending U.S. patent application Ser. No. 09/107,230 for METHOD AND APPARATUS FOR TRANSMITTING DATA IN A PUBLIC NETWORK filed simultaneously herewith, the entire specification of which is incorporated herein by reference for all purposes. Therefore, the scope of the invention should be determined with reference to the appended claims.

What is claimed is:

1. An apparatus for transmitting a data stream, comprising:

framing circuitry designed to generate a first sequence of data frames each having a first duration, the first sequence of data frames corresponding to a first data rate, the framing circuitry being programmed to receive and organize the data stream into a second sequence of data frames each having the first duration, the second sequence of data frames corresponding to a selected one of a plurality of equivalent data rates and a selected one of a plurality of framed data rates, each of the equivalent and framed data rates being lower than the first data rate;

modulation circuitry for modulating the second sequence of data frames and transmitting the modulated second sequence of data frames at the selected framed data rate;

first clock circuitry operable to provide any of a first plurality of clock signals to the framing circuitry, each of the first plurality of clock signals corresponding to one of the plurality of equivalent data rates; and second clock circuitry operable to provide any of a second plurality of clock signals to the modulation circuitry, each of the second plurality of clock signals corresponding to one of the plurality of framed data rates.

2. The apparatus of claim 1 wherein the framing circuitry includes a plurality of registers each of which corresponds to a data frame attribute, a first one of the registers corresponding to a first data frame attribute having an attribute value stored therein corresponding to the selected equivalent data rate.

3. The apparatus of claim 2 wherein the first data frame attribute corresponds to a number of data bits in a data frame payload block.

4. The apparatus of claim 1 wherein the framing circuitry is designed to generate the first sequence of data frames according to a high data rate digital subscriber line (HDSL) standard format and the first duration is 6 ms.

5. The apparatus of claim 1 wherein the modulation circuitry modulates the second sequence of data frames according to a 2B1Q encoding scheme.

6. The apparatus of claim 1 wherein the modulation circuitry comprises a bit pump.

7. The apparatus of claim 1 wherein the first clock circuitry comprises a plurality of oscillators each of which corresponds to one of the first plurality of clock signals.

8. The apparatus of claim 1 wherein the first clock circuitry comprises an oscillator and multiplier circuitry which is programmable to generate each of the first plurality of clock signals.

9. The apparatus of claim 1 wherein the second clock circuitry comprises a plurality of oscillators each of which corresponds to one of the second plurality of clock signals.

10. An apparatus for receiving a modulated sequence of data frames transmitted at a selected one of a plurality of framed data rates, comprising:

demodulation circuitry for demodulating the modulated sequence of data frames thereby generating a demodulated sequence of data frames each having a first duration, the demodulated sequence of data frames corresponding to the selected framed data rate;

framing circuitry designed to decompose a first sequence of data frames each having the first duration into a first data stream corresponding to a first data rate, the framing circuitry being programmed to receive and decompose the demodulated sequence of data frames into a second data stream corresponding to a selected one of a plurality of equivalent data rates, each of the equivalent and framed data rates being lower than the first data rate;

first clock circuitry operable to provide any of a first plurality of clock signals to the framing circuitry, each of the first plurality of clock signals corresponding to one of the plurality of equivalent data rates; and second clock circuitry operable to provide any of a second plurality of clock signals to the demodulation circuitry, each of the second plurality of clock signals corresponding to one of the plurality of framed data rates.

11. The apparatus of claim 10 wherein the framing circuitry includes a plurality of registers each of which corresponds to a data frame attribute, a first one of the registers corresponding to a first data frame attribute having an attribute value stored therein corresponding to the selected equivalent data rate.

12. The apparatus of claim 11 wherein the first data frame attribute corresponds to a number of data bits in a data frame payload block.

13. The apparatus of claim 10 wherein the first sequence of data frames conform to a high data rate digital subscriber line (HDSL) standard format and the first duration is 6 ms.

14. The apparatus of claim 10 wherein the demodulation circuitry demodulates the modulated sequence of data frames according to a 2B1Q decoding scheme.

15. The apparatus of claim 10 wherein the demodulation circuitry comprises a bit pump.

16. The apparatus of claim 10 wherein the first clock circuitry comprises a plurality of oscillators each of which corresponds to one of the first plurality of clock signals.

17. The apparatus of claim 10 wherein the first clock circuitry comprises an oscillator and multiplier circuitry operable to generate each of the first plurality of clock signals.

18. The apparatus of claim 10 wherein the second clock circuitry comprises a plurality of oscillators each of which corresponds to one of the second plurality of clock signals.

19. A method for transmitting a data stream, comprising:
receiving the data stream with framing circuitry designed to generate a first sequence of data frames each having a first duration, the first sequence of data frames corresponding to a first data rate;

organizing the data stream with the framing circuitry and associated first clock circuitry into a second sequence of data frames each having the first duration, the second sequence of data frames corresponding to a selected one of a plurality of equivalent data rates and a selected one of a plurality of framed data rates, each of the equivalent and framed data rates being lower than the first data rate;

modulating the second sequence of data frames using second clock circuitry; and transmitting the modulated second sequence of data frames at the selected framed data rate.

20. The method of claim 19 wherein the framing circuitry includes a plurality of registers each of which corresponds to a data frame attribute, a first one of the registers corresponding to a first data frame attribute, the method further comprising programming the first register with an attribute value corresponding to the selected equivalent data rate.

21. The method of claim 20 wherein the first data frame attribute corresponds to a number of data bits in a data frame payload block.

22. The method of claim 19 wherein the framing circuitry is designed to generate the first sequence of data frames according to a high data rate digital subscriber line (HDSL) standard format and the first duration is 6 ms.

23. The method of claim 19 wherein modulating the second sequence of data frames comprises encoding the second sequence of data frames using a 2B1Q encoding scheme.

24. The method of claim 19 wherein the framing circuitry is clocked by clock circuitry comprising a plurality of oscillators each of which corresponds to one of a plurality of clock signals, the method further comprising selecting one of the plurality of oscillators thereby providing a selected one of the plurality of clock signals to the framing circuitry, the selected clock signal corresponding to the selected equivalent data rate.

25. The method of claim 19 wherein the framing circuitry is clocked by clock circuitry comprising an oscillator and multiplier circuitry which is programmable to generate each of a plurality of clock signals, the method further comprising programming the multiplier circuitry thereby providing a selected one of the plurality of clock signals to the framing circuitry, the selected clock signal corresponding to the selected equivalent data rate.

26. The method of claim 19 wherein modulating the second sequence of data frames is achieved with modulation circuitry which is clocked by clock circuitry comprising a plurality of oscillators each of which corresponds to one of a plurality of clock signals, the method further comprising selecting one of the plurality of oscillators thereby providing a selected one of the plurality of clock signals to the modulation circuitry, the selected clock signal corresponding to the selected framed data rate.

27. A method for receiving a modulated sequence of data frames transmitted at a selected one of a plurality of framed data rates, comprising:
receiving the modulated sequence of data frames;
demodulating the modulated sequence of data frames using first clock circuitry thereby generating a demodulated sequence of data frames each having a first duration, the demodulated sequence of data frames corresponding to the selected framed data rate; and decomposing the demodulated sequence of data frames into a decomposed data stream corresponding to a selected one of a plurality of equivalent data rates, the decomposing being achieved with second clock circuitry, and framing circuitry designed to decompose a first sequence of data frames each having the first duration into a first data stream corresponding to a first data rate, each of the equivalent and framed data rates being lower than the first data rate.

28. The method of claim 27 wherein the framing circuitry includes a plurality of registers each of which corresponds to a data frame attribute, a first one of the registers corresponding to a first data frame attribute, the method further comprising programming the first register with an attribute value corresponding to the selected equivalent data rate.

29. The method of claim 28 wherein the first data frame attribute corresponds to a number of data bits in a data frame payload block.

30. The method of claim 27 wherein the framing circuitry is designed to generate the first sequence of data frames according to a high data rate digital subscriber line (HDSL) standard format and the first duration is 6 ms.

31. The method of claim 27 wherein demodulating the modulated sequence of data frames comprises decoding the modulated sequence of data frames using a 2B1Q decoding scheme.

32. The method of claim 27 wherein the framing circuitry is clocked by clock circuitry comprising a plurality of oscillators each of which corresponds to one of a plurality of clock signals, the method further comprising selecting one of the plurality of oscillators thereby providing a selected one of the plurality of clock signals to the framing circuitry, the selected clock signal corresponding to the selected equivalent data rate.

33. The method of claim 27 wherein the framing circuitry is clocked by clock circuitry comprising an oscillator and multiplier circuitry which is programmable to generate each of a plurality of clock signals, the method further comprising programming the multiplier circuitry thereby providing a selected one of the plurality of clock signals to the framing circuitry, the selected clock signal corresponding to the selected equivalent data rate.

34. The method of claim 27 wherein demodulating the modulated sequence of data frames is achieved with demodulation circuitry which is clocked by clock circuitry comprising a plurality of oscillators each of which corresponds to one of a plurality of clock signals, the method further comprising selecting one of the plurality of oscillators thereby providing a selected one of the plurality of clock signals to the demodulation circuitry, the selected clock signal corresponding to the selected framed data rate.

35. An apparatus for organizing a data stream into a sequence of data frames comprising framing circuitry designed to generate a first sequence of data frames each having a first duration, the first sequence of data frames corresponding to a first data rate, the framing circuitry being programmed to receive and organize the data stream using clock circuitry into a second sequence of data frames each having the first duration, the second sequence of data frames corresponding to a selected one of a plurality of equivalent data rates, each of the equivalent data rates being lower than the first data rate, wherein the framing circuitry is designed to generate the first sequence of data frames according to a high data rate digital subscriber line (HDSL) standard format and the first duration is 6ms.

36. An apparatus for decomposing a sequence of data frames into a data stream comprising framing circuitry designed to decompose a first sequence of data frames each having a first duration into a first data stream corresponding to a first data rate, the framing circuitry being programmed to receive a second sequence of data frames each having the first duration and decompose the second sequence of data frames using clock circuitry into a second data stream corresponding to a selected one of a plurality of equivalent data rates, each of the equivalent data rates being lower than the first data rate, wherein the framing circuitry is designed to decompose the first sequence of data frames corresponding to a high data rate digital subscriber line (HDSL) standard format and the first duration is 6 ms.

37. A method for organizing a first data stream into a first sequence of data frames comprising:

receiving the first data stream with framing circuitry designed to generate a second sequence of data frames each having a first duration, the second sequence of data frames corresponding to a first data rate; and organizing the first data stream with the framing circuitry and associated clock circuitry into the first sequence of data frames each having the first duration, the first sequence of data frames corresponding to a selected one of a plurality of equivalent data rates, each of the equivalent data rates being lower than the first data rate, wherein the framing circuitry is designed to generate the second sequence of data frames corresponding to a high data rate digital subscriber line (HDSL) standard format and the first duration is 6 ms.

38. A method for decomposing a first sequence of data frames into a first data stream comprising:

receiving the first sequence of data frames with framing circuitry designed to decompose a second sequence of data frames each having a first duration into a second data stream, the second data stream corresponding to a first data rate; and decomposing the first sequence of data frames each having the first duration using clock circuitry into the first data stream corresponding to a selected one of a plurality of equivalent data rates, each of the equivalent data rates being lower than the first data rate, wherein the framing circuitry is designed to decompose the second sequence of data frames corresponding to a high data rate digital subscriber line (HDSL) standard format and the first duration is 6 ms.

* * * * *